US011299399B2

(12) United States Patent
Fulton et al.

(10) Patent No.: US 11,299,399 B2
(45) Date of Patent: Apr. 12, 2022

(54) SYNTHESIS OF M13 CLUSTERS FROM ALUMINUM AND GALLIUM MINERAL POLYMORPHS

(71) Applicants: University of Oregon, Eugene, OR (US); Oregon State University, Corvallis, OR (US)

(72) Inventors: Brantly Fulton, Eugene, OR (US); Milton N. Jackson, Jr., Eugene, OR (US); Darren W. Johnson, Eugene, OR (US); Shannon W. Boettcher, Eugene, OR (US); Cory K. Perkins, Corvallis, OR (US); Douglas A. Keszler, Eugene, OR (US); James E. Hutchison, Eugene, OR (US)

(73) Assignees: University of Oregon, Eugene, OR (US); Oregon State University, Corvallis, OR (US)

( * ) Notice: Subject to any disclaimer, the term of this patent is extended or adjusted under 35 U.S.C. 154(b) by 188 days.

(21) Appl. No.: 16/717,853

(22) Filed: Dec. 17, 2019

(65) Prior Publication Data

US 2020/0207634 A1      Jul. 2, 2020

Related U.S. Application Data

(63) Continuation of application No. 15/742,412, filed as application No. PCT/US2016/041622 on Jul. 8, 2016, now Pat. No. 10,513,442.

(60) Provisional application No. 62/190,676, filed on Jul. 9, 2015.

(51) Int. Cl.
*C01F 7/24* (2006.01)
*C01G 15/00* (2006.01)
*C01F 7/20* (2006.01)
*B82Y 30/00* (2011.01)

(52) U.S. Cl.
CPC .................. *C01F 7/24* (2013.01); *C01F 7/20* (2013.01); *C01G 15/00* (2013.01); *B82Y 30/00* (2013.01); *C01P 2002/70* (2013.01); *C01P 2002/82* (2013.01); *C01P 2004/50* (2013.01); *C01P 2004/64* (2013.01)

(58) Field of Classification Search
CPC . C01F 7/24; C01G 15/00; B82Y 30/00; C01P 2002/82; C01P 2004/50; C01P 2002/70
See application file for complete search history.

(56) References Cited

U.S. PATENT DOCUMENTS

| 3,927,184 A | 12/1975 | Hodgson |
| 4,246,040 A | 1/1981 | Okumura et al. |
| 6,522,794 B1 | 2/2003 | Bischf et al. |

(Continued)

OTHER PUBLICATIONS

Francetič, Vojmir, and Peter Bukovec. "Peptization and Al-Keggin Species in Alumina Sol." Acta chimica slovenica 55.4 (2008).*

(Continued)

*Primary Examiner* — Richard M Rump
(74) *Attorney, Agent, or Firm* — Klarquist Sparkman, LLP

(57) ABSTRACT

A method comprising reacting an aluminum mineral polymorph or a gallium mineral polymorph with an acid at an aluminum metal to acid molar ratio or gallium metal to acid molar ratio sufficient to produce $M_{13}$ nanoscale clusters, M nano-agglomerates, or a $M_{13}$ slurry, wherein M is Al or Ga.

22 Claims, 9 Drawing Sheets

(56) References Cited

U.S. PATENT DOCUMENTS

| | | |
|---|---|---|
| 2005/0022863 A1 | 2/2005 | Agostinelli et al. |
| 2007/0169805 A1 | 7/2007 | Sasaki et al. |
| 2008/0312067 A1 | 12/2008 | Lortz et al. |
| 2010/0032012 A1 | 2/2010 | Isaka et al. |
| 2013/0084672 A1 | 4/2013 | Keszler et al. |

OTHER PUBLICATIONS

Drouin et al., "Rheology and structure of peptized boehmite pastes," *Journal of Colloid and Interface Science*, 125(1): 314-326, 1988.

Francetic et al., "Peptization and Al-Keggin Species in Alumina Solids," *Acta Chimica Slovenica*, 55(4): 904-908, 2008.

Gatlin et al., "Facile Synthesis of the Tridecameric $Al_{13}$ Nanocluster $Al_{13}(\mu_3\text{-}OH)_6(\mu_2\text{-}OH)_{18}(H_2O)_{24}(NO_3)_{15}$," *Inorganic Chemistry*, vol. 47, pp. 1267-1269, 2008.

International Search Report and Written Opinion issued for International Application No. PCT/US2016/041622 dated Nov. 6, 2016.

Jackson et al., "Identifying nanoscale $M_{13}$ clusters in the solid state and aqueous solution: vibrational spectroscopy and theoretical studies," *Inorganic Chemistry*, vol. 52, pp. 6187-6192, 2013.

Kamunde-Devonish et al., "Transmetalation of Aqueous Inorganic Clusters: A Useful Route to the Synthesis of Heterometallic Aluminum and Indium Hydroxo-Aquo Clusters," *Inorganic Chemistry*, vol. 53, pp. 7101-7105, 2014.

Mensinger et al., "Oligomeric group 13 hydroxide compounds—a rare but varied class of molecules," *Chemical Society Reviews*, vol. 41, pp. 1019-1030, 2012.

Mensinger et al., "Synthesis of Heterometallic Group 13 Nanoclusters and Inks for Oxide Thin-Film Transistors," *Angewandte Chemie International Edition*, vol. 47, pp. 9484-9486, 2008.

Oliveri et al., *Solution characterization of inorganic nanoscale cluster species via 1H-NMR and DOSY*, Dissertation submitted at University of Oregon, Eugene, OR, Dec. 2014.

Rather et al., "A Simple Organic Reaction Mediates the Crystallization of the Inorganic Nanocluster $[Ga_{13}(\mu_3\text{-}OH)_6(\mu_2\text{-}OH)_{18}(H_2O)_{24}](NO_3)_{15}$," *J. Am. Chem. Soc.*, vol. 127, pp. 3242-3243, 2005.

Wang et al., "$[Sc_2(\mu\text{-}OH)_2(H_2O)_6(NO_3)_2$: Aqueous Synthesis and Characterization" *Inorganic Chemistry*, vol. 52, pp. 1807-1811, 2013.

Wang et al., "Electrolytic synthesis of aqueous aluminum nanoclusters and in situ characterization by femtosecond Raman spectroscopy and computations," *Proceedings of the National Academy of Sciences*, 110(46): 18397-18401, 2013.

Wang et al., "Synthesis of the Hydroxide Cluster $[Al_{13}(\mu_3\text{-}OH)_6(\mu\text{-}OH)_{18}(H_2O)_{24}]^{15+}$ from an Aqueous Solution," *Inorganic Chemistry*, vol. 50, pp. 4683-4685, 2011.

Wang, *Synthesis and Characterization of Aluminum Oxide Based Materials: From Molecule to Device*, Dissertation submitted to Oregon State University, Aug. 23, 2013.

\* cited by examiner $13Al_2O_3 \text{ (Corundum)} + 26HNO_3 + 57H_2O \rightarrow 2[Al_{13}(OH)_{24}(H_2O)_{24}(NO_3)_{15}]$ $13Al(OH)_3 \text{ (Gibbsite)} + 15HNO_3 + 9H_2O \rightarrow Al_{13}(OH)_{24}(H_2O)_{24}(NO_3)_{15}$ $13Al(O)OH \text{ (Boehmite)} + 15HNO_3 + 22H_2O \rightarrow Al_{13}(OH)_{24}(H_2O)_{24}(NO_3)_{15}$ $13Ga(O)OH + 15HNO_3 + 22H_2O \rightarrow Ga_{13}(OH)_{24}(H_2O)_{24}(NO_3)_{15}$ $13Ga_2O_3 + 26HNO_3 + 57H_2O \rightarrow 2[Ga_{13}(OH)_{24}(H_2O)_{24}(NO_3)_{15}]$ $13Ga(OH)_3 \text{ (söhngeite)} + 15HNO_3 + 9H_2O \rightarrow Ga_{13}(OH)_{24}(H_2O)_{24}(NO_3)_{15}$

SYNTHESIS OF M13 CLUSTERS FROM ALUMINUM AND GALLIUM MINERAL POLYMORPHS

This application is a continuation of U.S. application Ser. No. 15/742,412, filed on Jan. 5, 2018, which is the U.S. National Stage of International Application No. PCT/US2016/041622, filed Jul. 8, 2016, which was published in English under PCT Article 21 (2), which in turn claims the benefit of U.S. Provisional Application No. 62/190,676, filed Jul. 9, 2015, which is incorporated herein by reference.

ACKNOWLEDGEMENT OF GOVERNMENT SUPPORT

This invention was made with government support under Grant Number CHE1102637 awarded by the National Science Foundation. The government has certain rights in the invention.

BACKGROUND

Metal oxide (WOO semiconducting materials have had a profound impact on the market for thin film device applications for numerous years. However, cost-effective mass production of high-purity materials remains challenging for scientists and engineers.

SUMMARY

Disclosed herein is a method comprising:
reacting an aluminum mineral polymorph or a gallium mineral polymorph with an acid at an aluminum metal to acid molar ratio or gallium metal to acid molar ratio sufficient to produce $M_{13}$ nanoscale clusters, M nano-agglomerates, or a $M_{13}$ slurry, wherein M is Al or Ga.

Also disclosed herein is a method comprising:
mixing an aluminum mineral polymorph or a gallium mineral polymorph with an acid to produce a slurry; and
processing the slurry under conditions sufficient to produce an aqueous solution of $M_{13}(\mu_3\text{-OH})_6(\mu_2\text{-OH})_{18}(H_2O)_{24}(NO_3)_{15}$ nanoscale clusters, wherein M is Al or Ga.

The foregoing will become more apparent from the following detailed description, which proceeds with reference to the accompanying figures.

DETAILED DESCRIPTION

Figure 1:
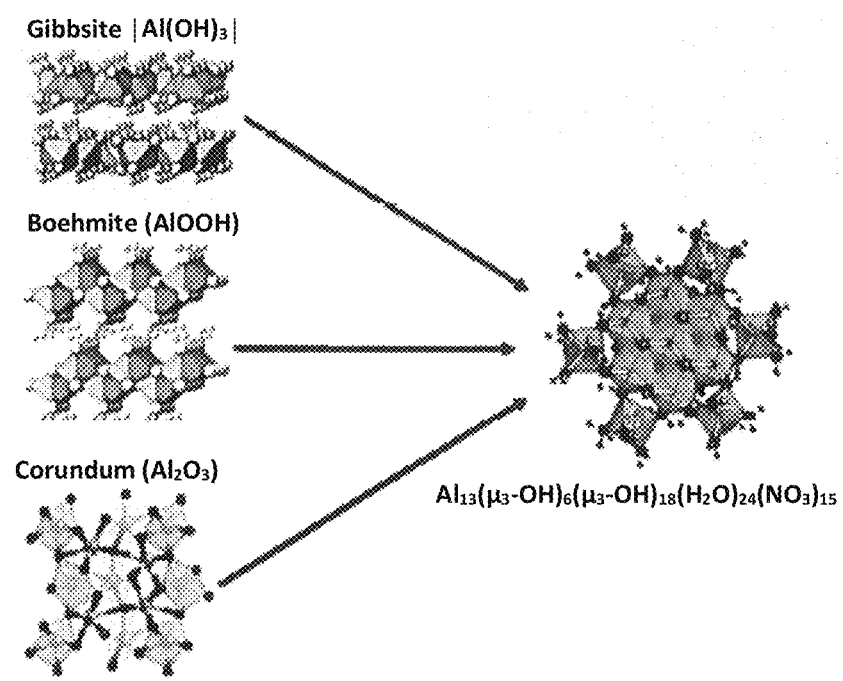
FIG. 1 is a structural representation of various aluminum materials that were converted to flat-$Al_{13}$ clusters via acidification according to the methods disclosed herein.

Methods such as vapor deposition are effective for producing atomically-uniform metal oxide thin films; however the process is expensive, time consuming, and product yields are low. Although solution processing of $M_{13}(\mu_3\text{-OH})_6(\mu_2\text{-OH})_{18}(H_2O)_{24}(NO_3)_{15}$ (M=Al or Ga) clusters is potentially a viable alternative to traditional deposition methods, product variability, reaction conditions, and long reaction times are deterrents for large-scale production. Advancements in the understanding of cluster reactivity have allowed chemists to develop more efficient and safer methods that utilize reducing agents such as zinc and electrochemical titrations to produce the aforementioned clusters. These methods however have significant drawbacks that include: long crystallization periods, extensive purification requirements, production of toxic byproducts, and the use of non-trivial and often expensive electrochemical apparatuses.

Disclosed herein is a facile and non-toxic synthesis of $M_{13}$ clusters. For convenience, "$M_{13}$ clusters" refers to $[M_{13}(\mu_3\text{-OH})_6(\mu_2\text{-OH})_{18}(H_2O)_{24}]_a[X]_{15a}$, wherein a is an integer of 1 to 4, $[M_{13}O_4(OH)_{24}(H_2O)_{12})]_b[X]_{7b}$, wherein b is an integer of 1 to 4, or a mixture thereof, wherein M is Al or Ga and X is a counterion derived from a protic acid. In certain embodiments, a $M_{13}$ cluster is $M_{13}(\mu_{13}\text{-OH})_6(\mu_2\text{-OH})_{18}(H_2O)_{24}(NO_3)_{15}$. $[M_{13}(\mu_3\text{-OH})_6(\mu 2\text{-OH})_{18}(H_2O)_{24}]_a[X]_{15a}$ is also known as "flat" $M_{13}$ and $[M_{13}O_4(OH)_{24}(H_2O)_{12})]_b[X]_{7b}$ is also known as "Keggin" $M_{13}$. "M nano-agglomerates" refers to a composition comprising $M_y$ species, wherein y is 2 to 32. For example, M nano-agglomerates may include $M_{13}$ clusters and at least one further M-containing component such as, for example, M-containing dimers and/or trimers, and/or larger aggregates such as $M_{26}$, $M_{30}$, or $M_{32}$. This synthesis requires no purification and takes advantage of acid-base chemistry to produce scalable quantities of clusters, nano-agglomerates, and slurries in high quantitative yields.

In one embodiment, a simple, inexpensive, and atom economical method has been developed to synthesize aqueous flat $M_{13}$ or Keggin $M_{13}$ nanoclusters via acidification of representative mineral polymorphs of purified aluminum or gallium oxides, oxyhydroxides, and/or hydroxides ($M_2O_3$, MO(OH), or $M(OH)_3$ where M=Al or Ga).

Under this principle, the acidification can be done directly with the mineral mined directly from the Earth, but would most likely require some form of purification and separation of other agglomerate material that may be present. With this synthetic route, these clusters can be produced on a mass scale and be potentially utilized for solution processing of amorphous metal oxide ($M_2O_3$) dielectric thin film devices commercially. Additionally, the slurry mixture can be used as a polishing agent for surface smoothing.

Nanoscale clusters generally refers to discrete, monodispersed architectures of oligomers linked together with defined dimensions that range from 1 nm≤x nm<5 nm, while nanoagglomerate species refer to dimensions ranging from 5 nm≤x nm<200 nm, and slurries are insoluble motifs that are 200 nm and beyond.

Aqueous nanoscale clusters, nano-agglomerates, and slurry mixtures have been synthesized via the acidification of bulk aluminum and gallium minerals/materials. This process can be carried out at wide concentration gradients from, for example, 1 mM to 4 M metal content and requires virtually no post-reaction purification or separation of excess monomer formed or initial reactant material used. The acidification products have a hydrodynamic radii of 1 nm±0.1 nm and can then be used directly "as is" as solution precursors for thin film fabrication so long as the original products used are pure (see, e.g., U.S. Pat. No. 9,340,678, for a description of the use as precursors for thin film fabrication). This synthetic route represents a facile, economical, and scalable scheme to mass-produce desirable precursor materials for solution processing transparent thin film devices. Identification of these clusters in the solid and solution states with powder x-ray diffraction, optical microscopy, Raman spectroscopy, and dynamic light scattering was consistent with data previously reported in the literature.

More specifically, disclosed herein in certain embodiments are methods for reacting an aluminum containing polymorphs or a gallium containing polymorphs with an acid to produce $M_{13}$ nanoscale clusters (e.g., $M_{13}(\mu_3\text{-OH})_6(\mu_2\text{-OH})_{18}(H_2O)_{24}(NO_3)_{15}$ nanoscale clusters). Also disclosed herein are methods of mixing an aluminum containing polymorph or a gallium containing polymorph mineral with an acid to produce a slurry, and processing the slurry under high enough acidic conditions (metal to acid ratio >1:0.7 mol. eq.) sufficient to produce an aqueous solution of $M_{13}$ nanoscale clusters (e.g., $M_{13}(\mu_3\text{-OH})_6(\mu_2\text{-OH})_{18}(H_2O)_{24}(NO_3)_{15}$ nanoscale clusters).

In principle, any representative mineral polymorph regardless of oxidation state can be made into a slurry or solution nanoscale cluster or nanoagglomerate in solution under the following conditions: the final product of cluster or agglomerate must contain a stabilizing proton accepting ion [ex. $NO_3^-$, $PO_4^{3-}$, $ClO_4^-$, $SO_4^{2-}$, ($X^-$ where X=F, Cl, Br, or I), $CO_3^{2-}$, $TsO^-$, $MnO_4^-$, $SeO_4^{2-}$] that would be generated via use of their corresponding acids, stable in the solid state and insoluble from a pH gradient of weakly acidic to weakly basic, and exhibits amphoterism. Thus X in $[M_{13}(\mu_3\text{-OH})_6(\mu_2\text{-OH})_{18}(H_2O)_{24}]_a[X]_{15a}$ or $[M_{13}O_4(OH)_{24}(H_2O)_{12})]_b[X]_{7b}$ may be monovalent counterion (meaning that subscript a or b is 1) or a polyvalent counterion (meaning that subscript a or b is greater than 1).

Illustrative aluminum-containing mineral polymorphs include corundum, gibbsite, boehmite, diaspore, bayerite, and nordstrandite and any combination or mixture thereof. Illustrative gallium-containing mineral polymorphs include Ga(O)OH, $Ga_2O_3$, Ga(OH)$_3$ (sohngeite), and any combination or mixture thereof. The acid may be any acid that dissolves the mineral. Illustrative acids that have the ability to dissolve the material include nitric acid, sulfuric acid, selenic acid, halide acids (e.g., hydrochloric acid, hydrobromic acid, hydroiodic acid, chloric acid, bromic acid, iodic acid), sulfonic acids (e.g., tosylic acid, sulfanilic acid, benzene sulfonic acid, salicylic acid, Armstrong's acid, triflic acid), carboxylic acids (formic acid, oxalic acid, acetic acid, carbonic acid), and a mixture thereof. Nitric acid is a preferred acid 1:0.3-1:0.65 mol. eq. of metal to acid ratio to produce slurries and 1:0.7-1:1.15 mol eq. of metal to acid ratio to produce nanoagglomerates, and 1:1.15-1:1.3 mol eq. of metal to acid to produce clusters). All other monovalent acids listed above will follow the same stoichiometry as nitric acid.

In certain embodiments, 1:1.15-1:1.3 mol eq. of metal to acid ratio will produce flat $[M_{13}(\mu_3\text{-OH})_6(\mu_2\text{-OH})_{18}(H_2O)_{24}]_a[X]_{15a}$. Of note, $[M_{13}(\mu_3\text{-OH})_6(\mu_2\text{-OH})_{18}(H_2O)_{24}]_a[X]_{15}$ clusters wherein X is polyvalent counterion (e.g., a divalent counterion such as $SO_4^{2-}$) can be produced by the methods disclosed herein.

In certain embodiments, 1:0.3-0.65 mol. eq. of metal to acid ratio (more particularly 1:0.45-0.65) will produce Keggin $[M_{13}O_4(OH)_{24}(H_2O)_{12})]_b[X]_{17b}$. Of note, $[M_{13}O_4(OH)_{24}(H_2O)_{12})]_b[X]_{7b}$ clusters wherein X is a monovalent counterion (e.g., $NO_3^-$) can be produced by the methods disclosed herein.

The mineral polymorph (M) is reacted with the acid, for example, at a $M^{3+}:NO_3^-$ molar ratio in a range to produce nanoscale clusters. In certain embodiments, the $M^{3+}:NO_3^-$ molar ratio is tunable over a wide concentration gradient, provided the $M^{3+}:NO_3^-$ molar ratio is controlled via controlling the mol. eq. of metal to acid so that the reaction does not proceed to formation of the metal nitrate salt (e.g., $Al(NO_3)_3$ or gallium nitrate $Ga(NO_3)_3$). Overall balanced equations for the reaction of metal bulk materials and $HNO_3$ are shown in FIG. 1. The reaction parameters and overall balanced equations are also applicable to acids other than nitric acid.

The mixing typically is carried out until complete dissolution occurs, causing a clear solution.

The slurry may be mixed at temperatures ranging from 25 to 100° C., more particularly 45 to 80° C., and most particularly 55 to 75° C.

The methods described herein may have a reaction time of 12 to 72 hours, more particularly 24 to 36 hours.

The methods disclosed herein do not require the use of any secondary reagents to facilitate cluster formation (e.g., zinc powder or di-butyl nitrosamine) or a potentially expensive electrochemical apparatus setup.

The methods disclosed herein can produce $M_{13}$ nanoscale clusters on a mass scale since the methods are very amenable to scaling up. For example, different forms of aluminum and gallium minerals can be used as starting materials under the same reaction conditions while consistently achieving the same $M_{13}$ end product. Only simple, inexpensive, and readily available reagents are used and can be readily scaled up to at least the kilogram scale. Atom economy for these methods is upwards of 90% yield, with water being the primary byproduct.

The methods disclosed herein may result in the formation of an $M_{13}$ nano-aggregate solution that has several different uses. For example, the $M_{13}$ nano-aggregate solution may be used as industrial polishing agent for chemical-mechanical planarization (CMP). In a further example, the $M_{13}$ nano-aggregate solution may be used as solution precursors for solution processing of metal oxide ($M_2O_3$) thin films for electronic device. For instance, transparent conductive oxide materials containing $Al^{3+}$ and/or $Ga^{3+}$ species derived from the aqueous precursors disclosed herein may be made.

Certain illustrative embodiments are described in consecutively numbered clauses as shown below:

1. A method comprising:
    reacting an aluminum mineral polymorph or a gallium mineral polymorph with an acid at an aluminum metal to acid molar ratio or gallium metal to acid molar ratio sufficient to produce $M_{13}(\mu_3\text{-OH})_6(\mu_2\text{-OH})_{18}(H_2O)_{24}(NO_3)_{15}$ nanoscale clusters, nano-agglomerates, or a slurry, wherein M is Al or Ga.

2. A method comprising:
    mixing an aluminum mineral polymorph or a gallium mineral polymorph with an acid to produce a slurry; and
    processing the slurry under conditions sufficient to produce an aqueous solution of $M_{13}(\mu_3\text{-OH})_6(\mu_2\text{-OH})_{18}(H_2O)_{24}(NO_3)_{15}$ nanoscale clusters, wherein M is Al or Ga.

3. The method of clause 1 or 2, wherein the aluminum mineral polymorph is selected from corundum, gibbsite, boehmite, diaspore, bayerite, nordstrandite, or any combination or mixture thereof.

4. The method of clause 1 or 2, wherein the gallium mineral polymorph is selected from Ga(O)OH, $Ga_2O_3$, $Ga(OH)_3$, or any combination or mixture thereof.

5. The method of any one of clauses 1 to 4, wherein the acid is selected from nitric acid, sulfuric acid, selenic acid, a halide acid, a sulfonic acid, a carboxylic acid, or a mixture thereof.

6. The method of any of clauses 1 to 4, wherein the acid is nitric acid.

7. The method of any one of clauses 1 or 3 to 6, wherein the aluminum metal to acid molar ratio or gallium metal to acid molar ratio is 1:0.3 mol eq of metal to acid to 1:1.3 mol. eq. of metal to acid.

8. The method of any of clauses 2 to 6, wherein the aluminum metal to acid molar ratio or gallium metal to acid molar ratio is greater than 1:0.7 mol eq.

9. The method of clause 6, wherein the aluminum metal to acid molar ratio or gallium metal to acid molar ratio is 1:0.3 to 1:0.65 mol eq to produce the slurry.

10. The method of clause 6, wherein the aluminum metal to acid molar ratio or gallium metal to acid molar ratio is 1:0.7 to 1:1.0 mol eq to produce the nano-agglomerates.

11. The method of clause 6, wherein the aluminum metal to acid molar ratio or gallium metal to acid molar ratio is 1:1.15 to 1:1.3 mol eq to produce the nanoscale clusters.

12. The method of any one of clauses 1 to 11, wherein the method is controlled to avoid formation of $Al(NO_3)_3$ or $Ga(NO_3)_3$.

13. The method of any one of clauses 1 to 12, wherein the nanoscale clusters have a dimension ranging from 1 nm to 5 nm.

14. The method of any one of clauses 1 or 3 to 12, wherein the nano-agglomerates have a dimension ranging from 5 nm to 200 nm.

15. The method of any one of clauses 1 or 3 to 12, wherein the slurry comprises insoluble motifs having a dimension greater than 200 nm.

EXAMPLES

Solution Preparation and Synthesis

All reagents were purchased from Sigma Aldrich and used without further modification. Varying $M^{3+}:NO_3^-$ molar ratios from 1:0.7-1.154 of $M(OH)_3$, MO(OH), or $M_2O_3$ powder to nitric acid (or other acids) are mixed under external ambient pressure forming slurry mixtures that range from 1 mM to 1 M metal content consistent throughout the reaction. The slurry is magnetically stirred at 60° C. until clear, resulting in complete solution dissolution. No further modification to the solution is done for solution phase spectroscopic measurements. For solid-state measurements aliquots of the solution were deposited on glass slides and allowed to crystallize for solid-state characterizations via Raman spectroscopy and single x-ray crystallography.

Solid State and Solution Characterization

Prior to analysis, each sample was filtered into the cuvette with a 0.1 PTFE, μm syringe filter to remove any particulate matter. The following dynamic light scattering (DLS) and phase analysis light scattering (PALS) measured using the Mobiuζ from Wyatt technologies. DLS was used to measure the hydrodynamic radius ($R_h$) of the alumina species in solution. The Dynamics software uses the Einstein-Stokes equation ($R_h = K_b T/6\pi\eta D_t$) where $K_b$=the Boltzmann constant, T temperature in kelvin, η=viscosity, and $D_t$=translational diffusion coefficient to solve for the $R_h$ value.

Raman spectra were collected using an Alpha 300S SNOM confocal Raman microscope in a 180° backscattering configuration. A continuous wave pump laser provided ~50 mW of power with an excitation wavelength of 53 nm. A 0.3 m spectrometer equipped with 600 grooves/mm grating was used to detect stokes Raman scattering and provided a resolution of 1 $cm^{-1}$. The spectra from each sample were averaged over 100 accumulations at 1 second exposure times. The 520.5 $cm^{-1}$ peak of Si was used as an internal standard.

Figure 2:
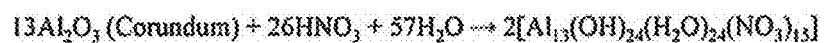
FIG. 2 shows overall balanced equations for the reaction of metal bulk materials and $HNO_3$.
Figure 2:
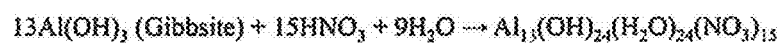
Figure 2:
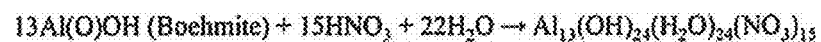
Figure 2:
Figure 2:
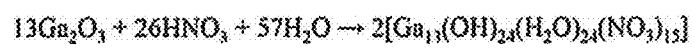
Figure 2:
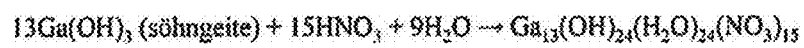

FIG. 2 is a structural representation of various aluminum materials that were converted to flat-$Al_{13}$ clusters via acidification according to the methods disclosed herein.

Figure 3A:
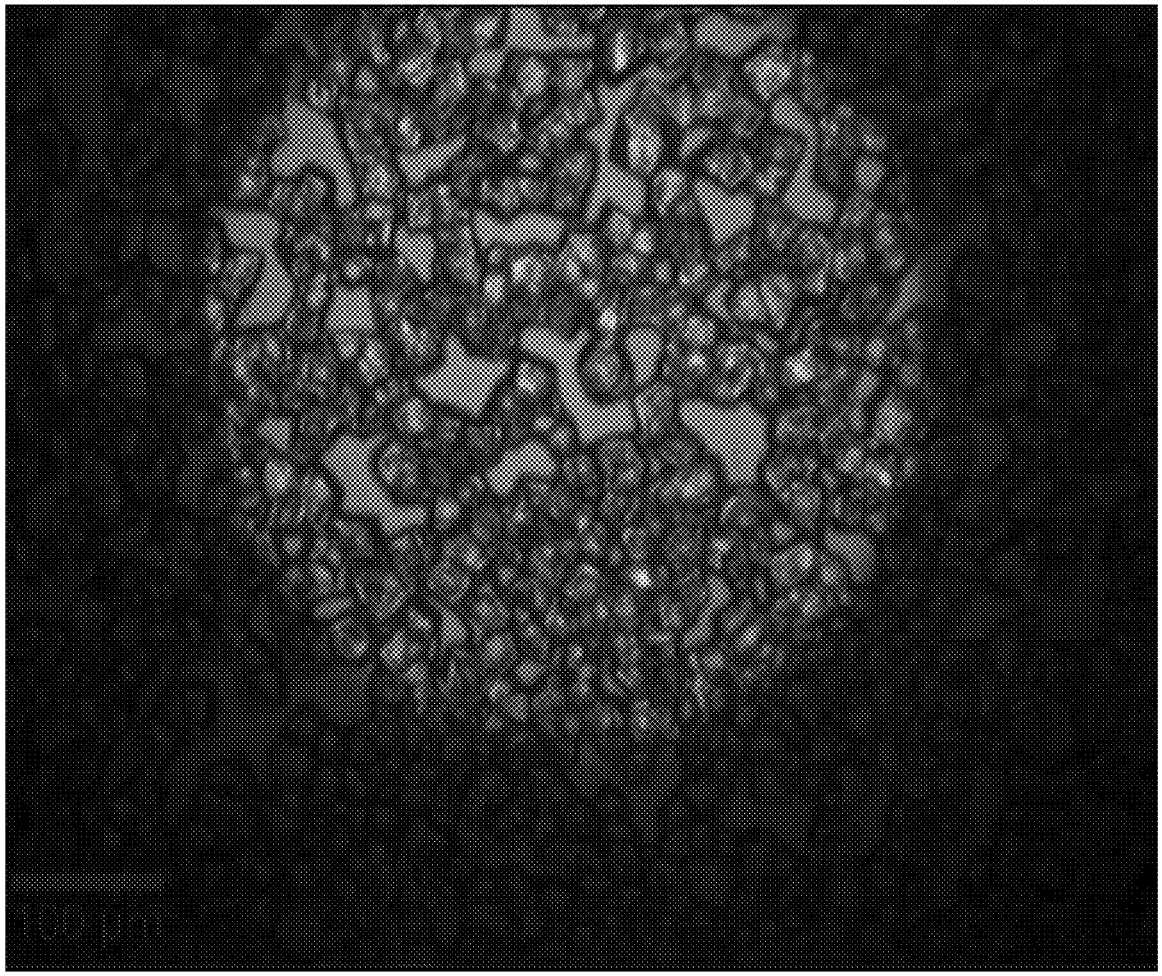
FIGS. 3A and 3B are optical microscope images of $Al_{13}$ (FIG. 3A) and $Ga_{13}$ (FIG. 3B) single crystal produced from the acidification process disclosed herein.
Figure 3B:
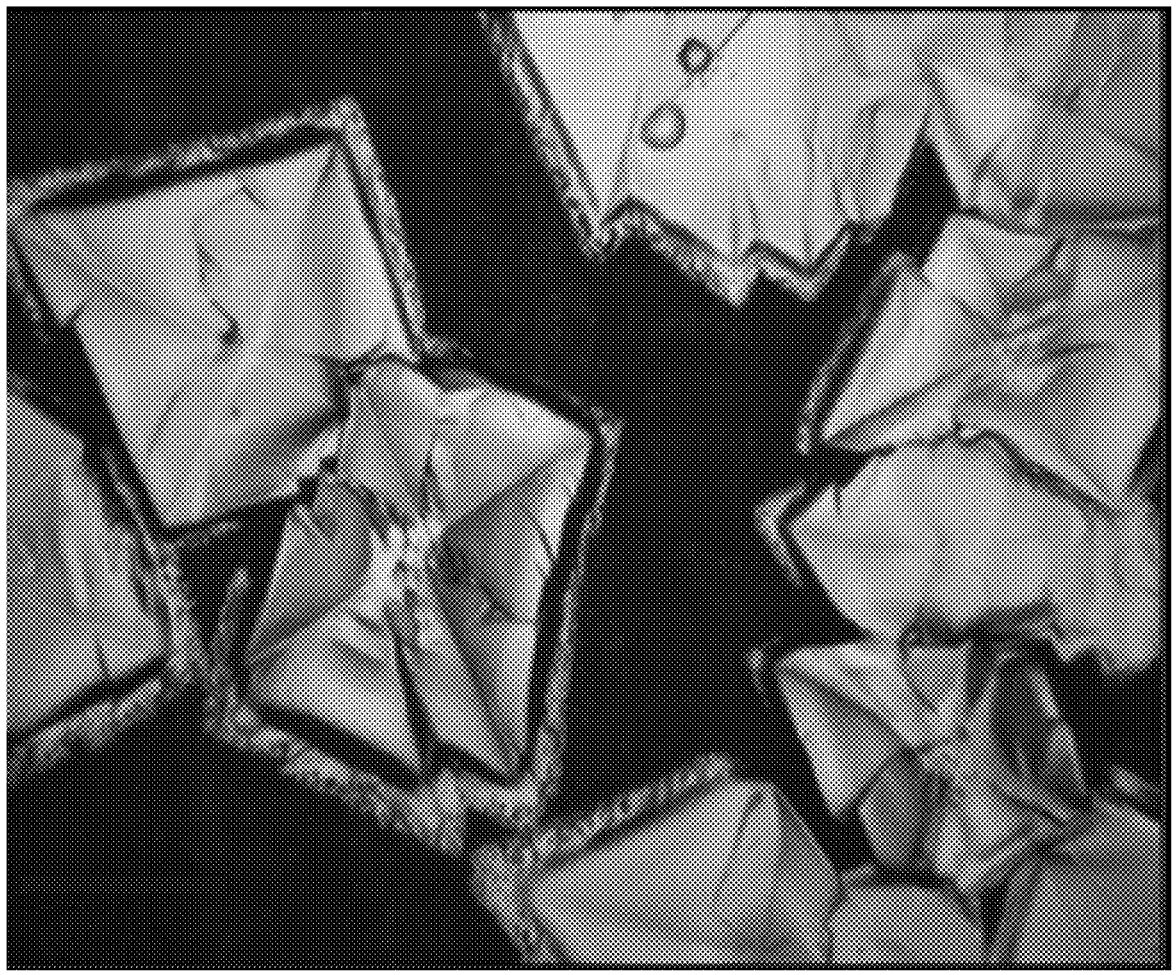

FIGS. 3A and 3B are optical microscope images of $Al_{13}$ (FIG. 3A) and $Ga_{13}$ (FIG. 3B) single crystal produced from the acidification process disclosed herein.

Figures 4A, 4B:
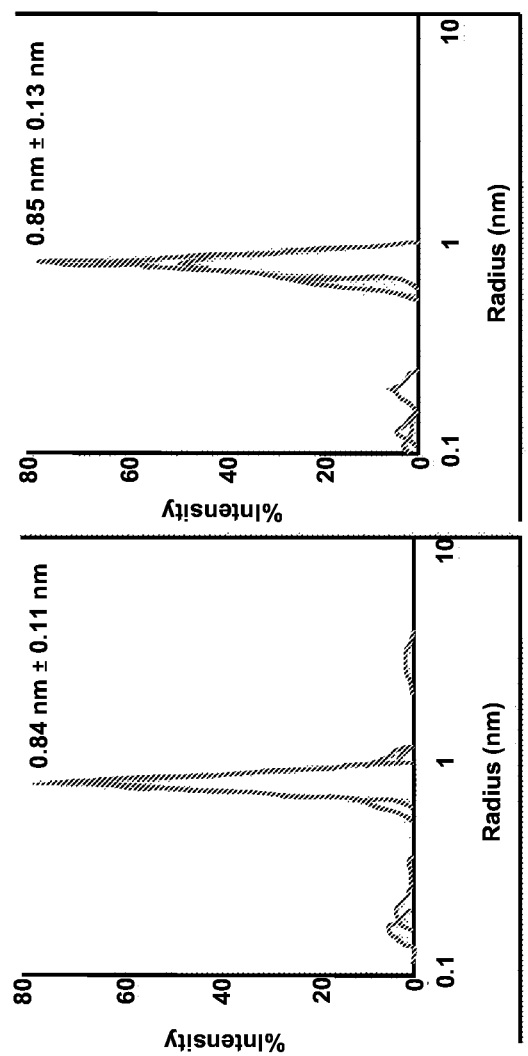
FIGS. 4A and 4B show dynamic light scattering of $Al_{13}$ (FIG. 4A) and $Ga_{13}$ (FIG. 4B) in 0.1 M aqueous solutions.

FIGS. 4A and 4B show dynamic light scattering of $Al_{13}$ (FIG. 4A) and $Ga_{13}$ (FIG. 4B) in 0.1 M aqueous solutions.

Figures 5A, 5B:
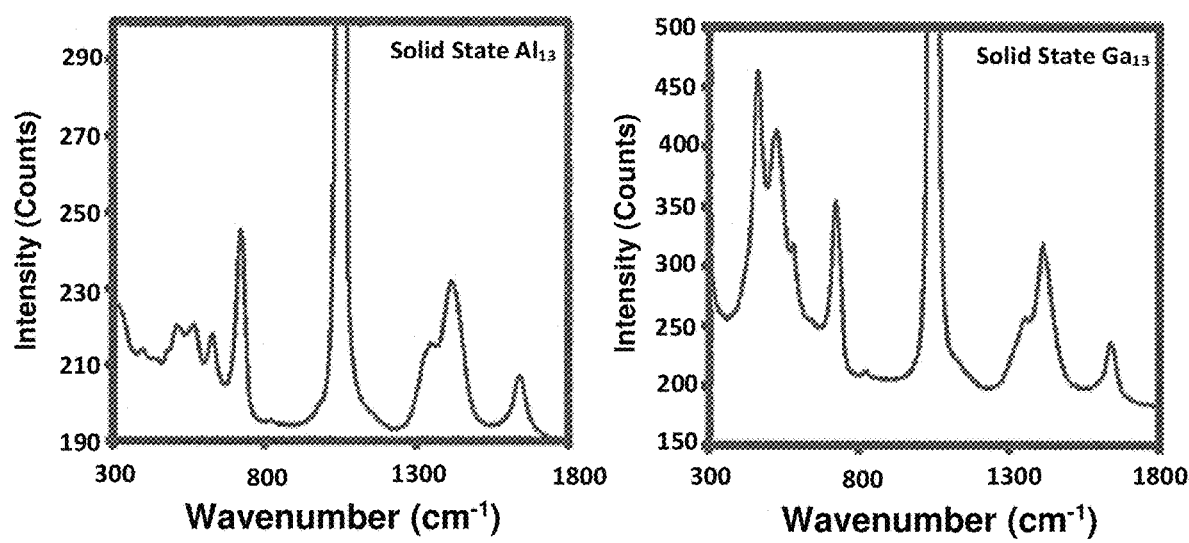
FIGS. 5A and 5B are solid state Raman spectra of $Al_{13}$ (FIG. 5A) and $Ga_{13}$ (FIG. 5B). Both spectra are consistent with previous reports of both clusters.

FIGS. 5A and 5B are solid state Raman spectra of $Al_{13}$ (FIG. 5A) and $Ga_{13}$ (FIG. 5B). Both spectra are consistent with previous reports of both clusters.

Figure 6:
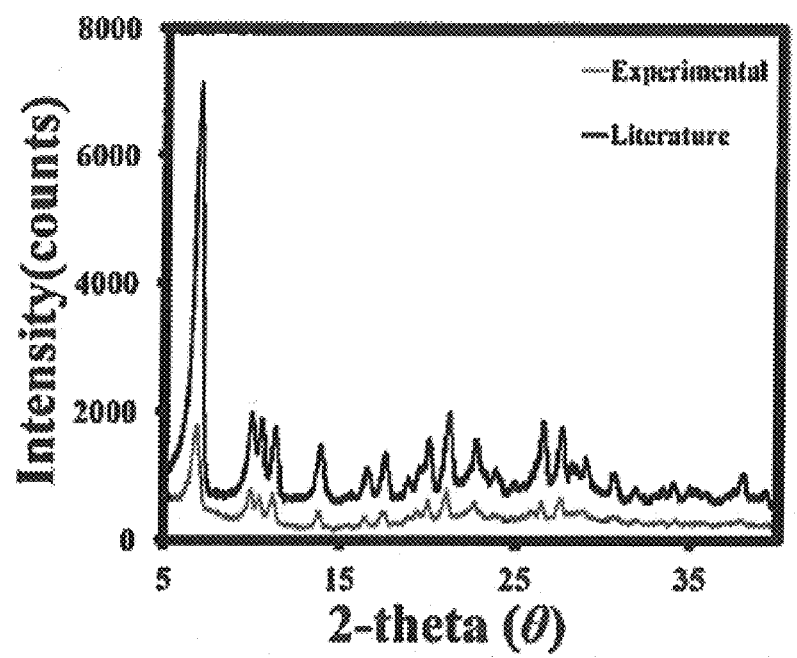
FIG. 6 is a powder x-ray of $Al_{13}$ experimental compared with literature references.

FIG. 6 is a powder x-ray of $Al_{13}$ experimental compared with literature references.

Figure 7:
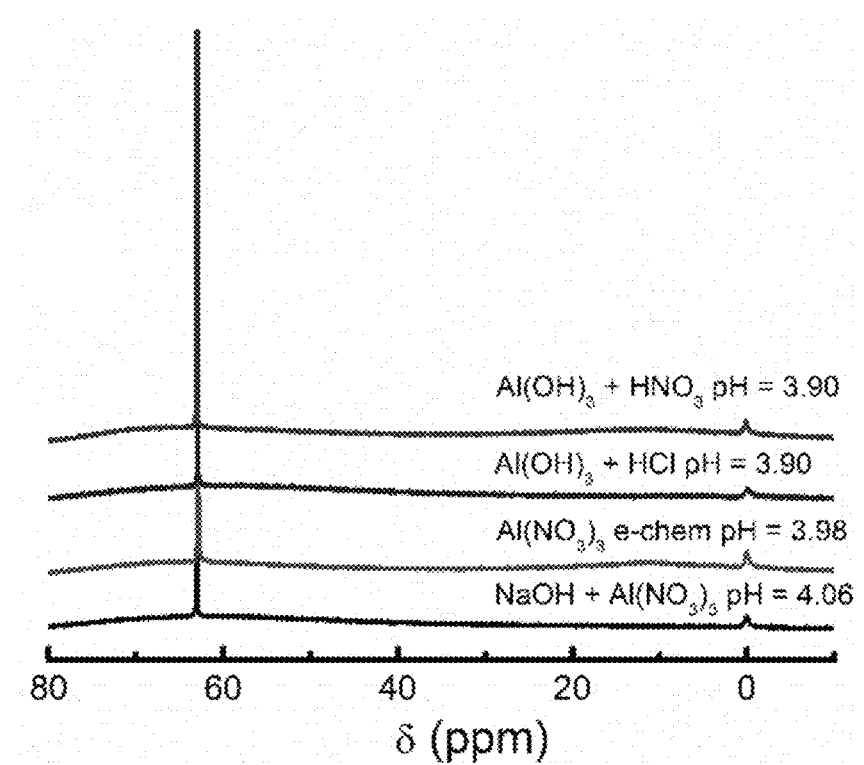
FIG. 7 is a $^{27}Al$ NMR spectra of Al13 Keggin ions from different synthetic methods.

Synthesis of Aluminum $Al_{13}$ Keggin Ion by Controlled Dissolution of $Al(OH)_3$ in an Aqueous Monoprotic Acid The aluminum $Al_{13}$ Keggin cluster $[Al_{13}O_4(OH)_{24}(H_2O)_{12})^{7+}]$ is widely used in applications such as water treatment and flocculation. The current synthetic procedure to produce the cluster is addition of an aqueous base, e.g. NaOH, KOH, $NH_3$, or $Ca(OH)_2$ to an aqueous solution of $Al(NO_3)_3$ or $AlCl_3$. By adding 0.54 parts of a monoprotic strong acid to 1 part $Al(OH)_3$ under mild heating conditions (60-90° C.), the Keggin ion forms in high yield. The product of this synthesis has been scaled to liter quantities at concentrations as high as 1 M with respect to Al. This approach yields a material free of alkali, alkaline-earth, and transition-metal ions, leading to a protonated version of the material for water remediation and flocculation. FIG. 7 shows the NMR spectrum of the material synthesized using the traditional NaOH titration of $Al(NO_3)_3$ compared to this claimed dissolution method. Clearly, the spectra from acid addition match the characteristic spectrum for the Na-Keggin $[(NaAl_{13}O_4(OH)_{24}(H_2O)_{12})^{7+}]$.

Figure 8:
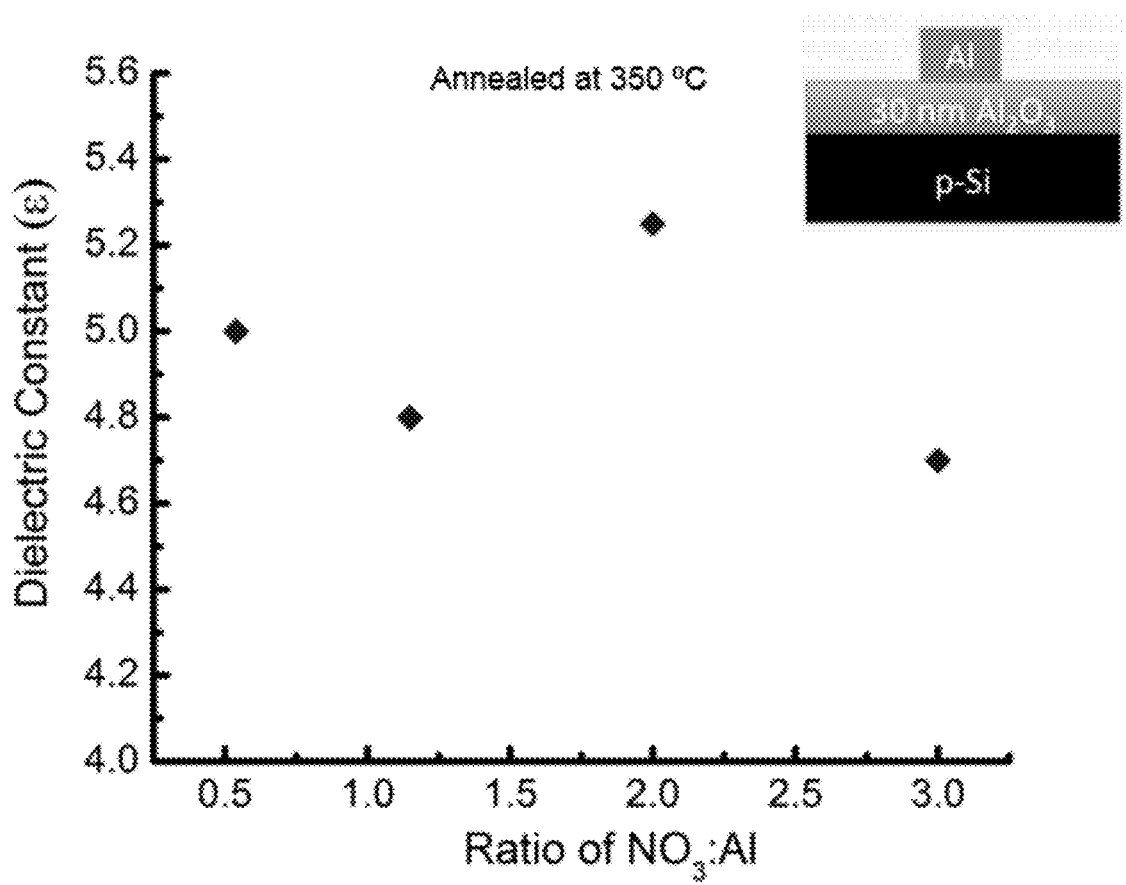
FIG. 8 is a graph showing dielectric constants for $Al_2O_3$ thin-films from precursors disclosed herein with selected ratios of $NO_3^-$:$Al^{3+}$. The Keggin ion (Ratio 0.5 $NO_3^-$:1 $Al^{3+}$) shows a higher dielectric constant, suggesting that the material makes more continuous (less porous) thin-films with a 350° C. anneal. The inset shows the test structure of the MIS device used for the CV measurement.

Additional work shows that the $Al_{13}$ Keggin cluster $[(Al_{13}O_4(OH)_{24}(H_2O)_{12})^{7+}]$ can be used as a precursor for solution processed amorphous thin-film dielectric materials. Initial data from an MIS test structure suggests an improved quality of film properties using alumina precursors with decreased counterion concentration after annealing at 350° C. (FIG. 8).

In view of the many possible embodiments to which the principles of the disclosed compositions and methods may be applied, it should be recognized that the illustrated embodiments are only preferred examples of the invention and should not be taken as limiting the scope of the invention.

What is claimed is:
1. A method comprising:
reacting an aluminum mineral polymorph with an acid at an aluminum metal to acid molar ratio sufficient to produce $M_{13}$ nanoscale clusters or $M_{13}$ nano-agglomerates, wherein M is Al and the aluminum metal to acid molar ratio is 1:0.7 to 1:1.0 mol eq of metal to acid to produce the nano-agglomerates or 1:1.15 to 1:1.3 mol eq of metal to acid to produce the nanoscale clusters.

2. The method of claim 1, wherein the aluminum mineral polymorph is selected from corundum, gibbsite, boehmite, diaspore, bayerite, nordstrandite, or any combination or mixture thereof.

3. The method of claim 1, wherein the acid is selected from nitric acid, sulfuric acid, selenic acid, a halide acid, a sulfonic acid, a carboxylic acid, or a mixture thereof.

4. The method of claim 1, wherein the acid is nitric acid.

5. The method of claim 1, wherein the method produces the nano-agglomerates.

6. The method of claim 1, wherein the method produces the nanoscale clusters.

7. The method of claim 1, wherein the method is controlled to avoid formation of $Al(NO_3)_3$.

8. The method of claim 1, wherein the nanoscale clusters have a dimension ranging from 1 nm to 5 nm.

9. The method of claim 1, wherein the nano-agglomerates have a dimension ranging from 5 nm to 200 nm.

10. The method of claim 5, wherein the acid is nitric acid.

11. The method of claim 5, wherein the aluminum mineral polymorph is selected from corundum, gibbsite, boehmite, diaspore, bayerite, nordstrandite, or any combination or mixture thereof.

12. The method of claim 10, wherein the aluminum mineral polymorph is selected from corundum, gibbsite, boehmite, diaspore, bayerite, nordstrandite, or any combination or mixture thereof.

13. The method of claim 6, wherein the acid is nitric acid.

14. The method of claim 6, wherein the aluminum mineral polymorph is selected from corundum, gibbsite, boehmite, diaspore, bayerite, nordstrandite, or any combination or mixture thereof.

15. The method of claim 13, wherein the aluminum mineral polymorph is selected from corundum, gibbsite, boehmite, diaspore, bayerite, nordstrandite, or any combination or mixture thereof.

16. The method of claim 1, wherein the method produces an aqueous $M_{13}$ nanoscale clusters solution.

17. The method of claim 1, wherein the method produces an aqueous $M_{13}$ nano-agglomerates solution.

18. A method comprising:
reacting an aluminum mineral polymorph with an acid at an aluminum metal to acid molar ratio sufficient to produce $M_{13}$ nanoscale clusters, $M_{13}$ nano-agglomerates, or a $M_{13}$ slurry, wherein M is Al and the aluminum metal to acid molar ratio is greater than 1:0.7 mol eq. of metal to acid to less than or equal 1:1.3 mol. eq. of metal to acid.

19. The method of claim 18, wherein the aluminum mineral polymorph is selected from corundum, gibbsite, boehmite, diaspore, bayerite, nordstrandite, or any combination or mixture thereof.

20. The method of claim 18, wherein the acid is selected from nitric acid, sulfuric acid, selenic acid, a halide acid, a sulfonic acid, a carboxylic acid, or a mixture thereof.

21. The method of claim 18, wherein the acid is nitric acid.

22. The method of claim 19, wherein the acid is nitric acid.

* * * * *